United States Patent [19]

Kawahara

[11] Patent Number: 5,789,736
[45] Date of Patent: Aug. 4, 1998

[54] SIGNAL READOUT CIRCUIT HAVING A TWO-DIMENSIONAL FOCAL PLANE CELL ARRAY CAPABLE OF READING OUT SIGNALS WITH IMPROVED RESOLUTION

[75] Inventor: Akihiro Kawahara, Tokyo, Japan

[73] Assignee: NEC Corporation, Tokyo, Japan

[21] Appl. No.: 690,943

[22] Filed: Aug. 1, 1996

Related U.S. Application Data

[63] Continuation of Ser. No. 306,322, Sep. 15, 1994, abandoned.

[30] Foreign Application Priority Data

Sep. 16, 1993 [JP] Japan .................................. 5-229946

[51] Int. Cl.$^6$ .................................................. H01L 27/00
[52] U.S. Cl. .......................... 250/208.1; 250/216; 348/302
[58] Field of Search ............................ 250/208.1, 216, 250/208.2; 348/302, 308

[56] References Cited

U.S. PATENT DOCUMENTS

| | | |
|---|---|---|
| 4,456,929 | 6/1984 | Aoki et al. ........................ 348/308 |
| 4,779,004 | 10/1988 | Tew et al. ........................ 250/578 |
| 4,985,619 | 1/1991 | Arques ........................ 250/208.1 |
| 4,996,413 | 2/1991 | McDaniel et al. ........................ 250/208.1 |
| 5,184,018 | 2/1993 | Conrads et al. ........................ 250/370.09 |

OTHER PUBLICATIONS

Ballingal et al., "Practical Design Consideration in Achieving High Performance from Infrared Hybrid Focal Plane Arrays", SPIE, vol. 819, Infrared Technology XIII, 1987, pp. 224–231.

Dennis et al., "Staring Arrays—the future lightweight imagers", SPIE, vol. 572, Infrared Technology XI, 1985, pp. 22–27.

Ballingal et al., "Two Dimensional Infrared Focal Plane Arrays Utilising a Direct Inject Input Scheme", SPIE, vol. 685 Infrared Technology XII, 1986, pp. 115–122.

Primary Examiner—Stephone B. Allen
Attorney, Agent, or Firm—Foley & Lardner

[57] ABSTRACT

A focal plane array having unit cells 1 is arranged in two-dimensional array in the directions of rows and columns. Each of the unit cells 1 has a photo detection element 3 and a column selection transistor 4. A plurality of signal readout lines 5 run across the unit cells in the direction of rows. A column selection line 6 runs across the unit cells in the direction of columns to control a conductivity state of the column selection transistor 4. A first shift register 7 is connected with the column selection line 6. A charge integration capacitor 9 and a row selection transistor 11 are connected with the signal readout line 5 through a direct injection gate transistor 8. A second shift register 12 controls a conductivity state of the row selection transistor 11. A reset transistor 14 charges the charge integration capacitor 9. Exchange switches 10 switch by time division the plurality of the signal readout lines 5 to a signal output line 13 for external output.

10 Claims, 4 Drawing Sheets

SIGNAL READOUT CIRCUIT HAVING A TWO-DIMENSIONAL FOCAL PLANE CELL ARRAY CAPABLE OF READING OUT SIGNALS WITH IMPROVED RESOLUTION

This application is a continuation of application Ser. No. 08/306,322, filed Sept. 15, 1994, now abandoned.

DETAILED DESCRIPTION OF THE INVENTION

The present invention relates to a signal readout circuit and its drive circuit used for a charge integration type two-dimensional array photodetectors.

A two-dimensional array infrared detector comprises a photo detection section and a signal readout section for reading out signals detected by the photo detection section. A conventional line integration type signal readout circuit generally used as the signal readout section is shown in FIG. 3. This line integration signal readout circuit comprises a focal plane array 1 in which unit cells 2 are arranged in row and column directions, that is, in a two-dimensional array state. Each of the unit cells 2 has a photo detection element 3 and a column selection transistor 4. A signal readout line 5 and a column selection line 6 run across the unit cell in the row and the column directions, respectively. The column selection transistor 4 is placed between the photo detection element 3 and the signal readout line 5, and the conductivity state at each column is determined by the column selection line 6 connected to the output of an X-shift register 7.

The signal readout line 5 is connected to a signal output line 13 through a direct injection gate transistor (hereinafter referred to as "DIG transistor") 8 and a row selection transistor 11. The signal readout line 5 is connected with a charge integration capacitor 9, and the row selection transistor 11 is connected with a Y-shift register 12.

Signal detection operation is performed in a cycle for each column, the cycle consisting of integration, readout and reset processes (the time for these processes being defined as 1 H). The shifting time of output pulses from the X-shift register 7 corresponds to the above-mentioned 1 H. The signal detection operation, i.e., the integration, readout and reset processes, of the unit cell will be described below.

When any one of the column selection line 6 is selected by the X-shift register 7, that is, when the column selection transistor 4 of any one of the columns is in conductivity state, the photo detection element 3 of the column is electrically connected with the signal readout line 5. In this state, the photo detection element 3, column selection transistor 4, DIG transistor 8, and charge integration capacitor 9 constitute a series circuit, and the charge previously stored in the charge integration capacitor 9 is discharged via the DIG transistor 8 and the photo detection element 3. After the discharge for a fixed time, the column selection transistor 4 is opened to stop the discharge. The above operation is the integration process. The integration time is given by the signal S1, the maximum time being 1 H which is the output pulse phase difference of the X-shift register 7.

After completion of the integration process, the row selection transistors 11 controlled by output signals of the Y-shift register 12 are closed/opened one by one, and voltage signals of the respective charge integration capacitor 9 are thereby transferred to a signal output line 13, and are supplied to an output terminal 17 through a buffer amplifier 16. This is the process of readout.

After completion of the readout process, a reset transistor 14 is closed, and the charge integration capacitor 9 in which the readout process is completed is charged again. This is the process of reset operation.

Thus, this one cycle of integration, readout and reset sequentially proceeds from one row to another repeatedly until the signal detection operation of one frame is completed.

The above described line integration type signal readout circuit is generally used as a signal readout circuit of two-dimensional array infrared detector. One of the performance indices of two-dimensional array infrared detectors is a noise equivalent temperature difference (NETD) dependent on the integration time of the signal detection operation.

FIG. 4 shows an example of the relation between the temperature resolution and the integration time obtained from a two-dimensional array infrared detector in which HgCdTe photodiodes are employed for receiving light of long wavelength band as photo detection elements. In FIG. 4, the optical system is an F number 2 matching system. Known from FIG. 4 is that the relation between the integration time and the temperature resolution is in a positive correlation.

When a 256×256 array infrared detector with one output line is operated at 60 Hz, its signal detection time is obtained as follows. Since the integration, readout and reset of the unit cells in the same row of the infrared detector are performed through the same signal readout line, signal detection operations in multi-columns cannot be carried out simultaneously. The maximum signal detection time per column (1 H) is, therefore, 65 µs by the following equation:

(Integration time + Readout time + Reset time)
$$= 1H$$
$$= 1/60/256$$
$$\approx 65 \mu s$$

Allocating half of the 1 H to the integration time gives an integration time of 32.5 µs, and the temperature resolution, approximately 0.1K, is determined from FIG. 4. The readout and reset operation time per unit cell (1 V), about 127 ns, is determined from the following equation:

$$1V = 1H/2/256$$
$$= 127 \text{ ns}$$

This time is not necessarily sufficient, considering the time constant of the readout circuit and the time required for sample holding by the AD converter in the signal processing circuit.

Proposed to solve this problem is a method of dividing the focal plane array of the signal readout circuits into some small areas and processing each area in parallel. In this method, however, the readout processes in multi-columns are performed simultaneously and therefore the time series need to be arranged in order by an external signal processing circuit, resulting in a complicated signal processing circuit construction.

An object of the present invention is therefore to provide a signal readout circuit and its drive circuit for improving temperature resolution.

According to the present invention there is provided a signal readout circuit, comprising: a focal plane array having unit cells arranged in two-dimensional array in the directions of rows and columns, each of the unit cells having a photo detection element and a column selection transistor; a plurality of signal readout lines running across the unit cells in the direction of rows; a column selection line running across the unit cells in the direction of columns to control the conductivity state of the column selection transistor; a first shift register connected with the column selection line; a charge integration capacitor and a row selection transistor connected with the signal readout line through a direct injection gate transistor; a second shift register for controlling a conductivity state of the row selection transistor; a reset transistor for charging the charge integration capacitor; and exchange switches for switching the plurality of the signal readout lines to a signal output line for external output by time division.

According to a drive circuit of a signal readout circuit comprising: a focal plane array having unit cells arranged in two-dimensional array in the directions of rows and columns, each of the unit cells having a photo detection element and a column selection transistor; a plurality of signal readout lines running across the unit cells in the direction of rows; a column selection line running across the unit cells in the direction of columns to control a conductivity state of the column selection transistor; a first shift register connected with the column selection line; a charge integration capacitor and a row selection transistor connected with the signal readout line through a direct injection gate transistor; a second shift register for controlling a conductivity state of the row selection transistor; a reset transistor for charging the charge integration capacitor; and exchange switches for switching the plurality of the signal readout lines to a signal output line for external output by time division, wherein a plurality of selection transistors in different columns are simultaneously made conductivity state and an integration by the charge integration capacitors corresponding to the signal readout lines are simultaneously performed.

According to another aspect of a drive circuit of a signal readout circuit comprising: a focal plane array having unit cells arranged in two-dimensional array in the directions of rows and columns, each of the unit cells having a photo detection element and a column selection transistor; a plurality of signal readout lines running across the unit cells in the direction of rows; a column selection line running across the unit cells in the direction of columns to control a conductivity state of the column selection transistor; a first shift register connected with the column selection line; a charge integration capacitor and a row selection transistor connected with the signal readout line through a direct injection gate transistor; a second shift register for controlling a conductivity state of the row selection transistor; a reset transistor for charging the charge integration capacitor; and exchange switches for switching the plurality of the signal readout lines to a signal output line for external output by time division, wherein the readout and/or reset operation for the charge integration capacitors connected with other signal readout lines than the signal readout lines connected with the column selection transistors are performed where any one or more column selection transistors are in conductivity state.

Other objects and features of the present invention will be clarified from the following description with reference to attached drawings.

DESCRIPTION OF THE PREFERRED EMBODIMENTS

The signal readout circuit and its drive circuit of the present invention are more fully disclosed in the following description of the preferred embodiments.

Figure 1:
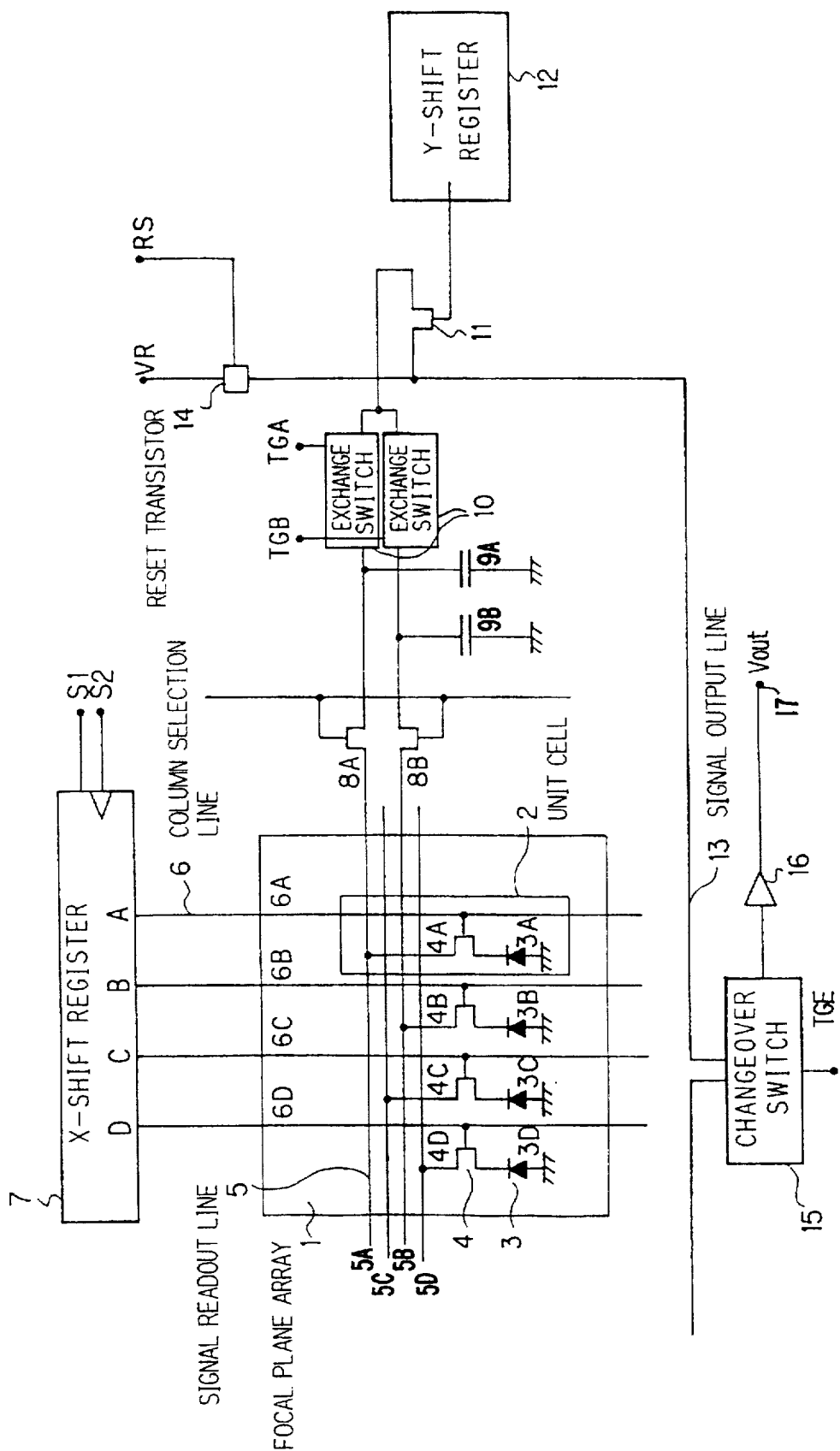
FIG. 1 shows a signal readout circuit for infrared detector according to the present invention.

FIG. 1 shows a signal readout circuit for the 256×256 array infrared-ray detector according to the present invention.

The signal readout circuit comprises a focal plane array 1 where unit cells 2, which are the units of arrangement, are arranged in square matrix form in the directions of rows and columns. For simplification, FIG. 1 shows four adjoining unit cells 2 only of one pattern.

Each unit cell 2 has a photo detection element 3 (3A, 3B, 3C and 3D) and a column selection transistor 4 (4A, 4B, 4C, and 4D). Four signal readout lines 5 (5A, 5B, 5C and 5D) run across each unit cell 2 in the direction of the rows, and one column selection line 6 (6A, 6B, 6C, and 6D) runs across it in the direction of the columns.

The column selection lines 6A–6D are connected with an X-shift register 7 to provide an input gate of the column selection transistor 4 and to control the conductivity state for each column.

Each of the four column selection transistors 4A–4D in the unit cells in the four adjoining columns is connected with a different one of the signal readout lines 5A–5D, respectively. This connection pattern is repeated in the direction of the columns.

The set of the four signal readout lines is constructed such that the signal readout lines 5A and 5B are operated for signal processing on the right-hand side, while the signal readout lines 5C and 5D on the left-hand side. Both sides being symmetric, FIG. 1 shows the right-hand side only to represent the construction. The signal readout lines 5A and 5B have its own DIG transistor 8A and 8B and its own charge integration capacitor 9A and 9B.

The signal readout lines 5A, 5B are connected with a signal output line 13 through an exchange switch 10 and a row selection transistor 11. The signal output line 13 is thence connected through an exchange switch 15 and a buffer amplifier 16 with an output terminal 17. The row selection transistor 11 is connected with a Y-shift register 12 and is controlled by the Y-shift register 12.

Figure 2:
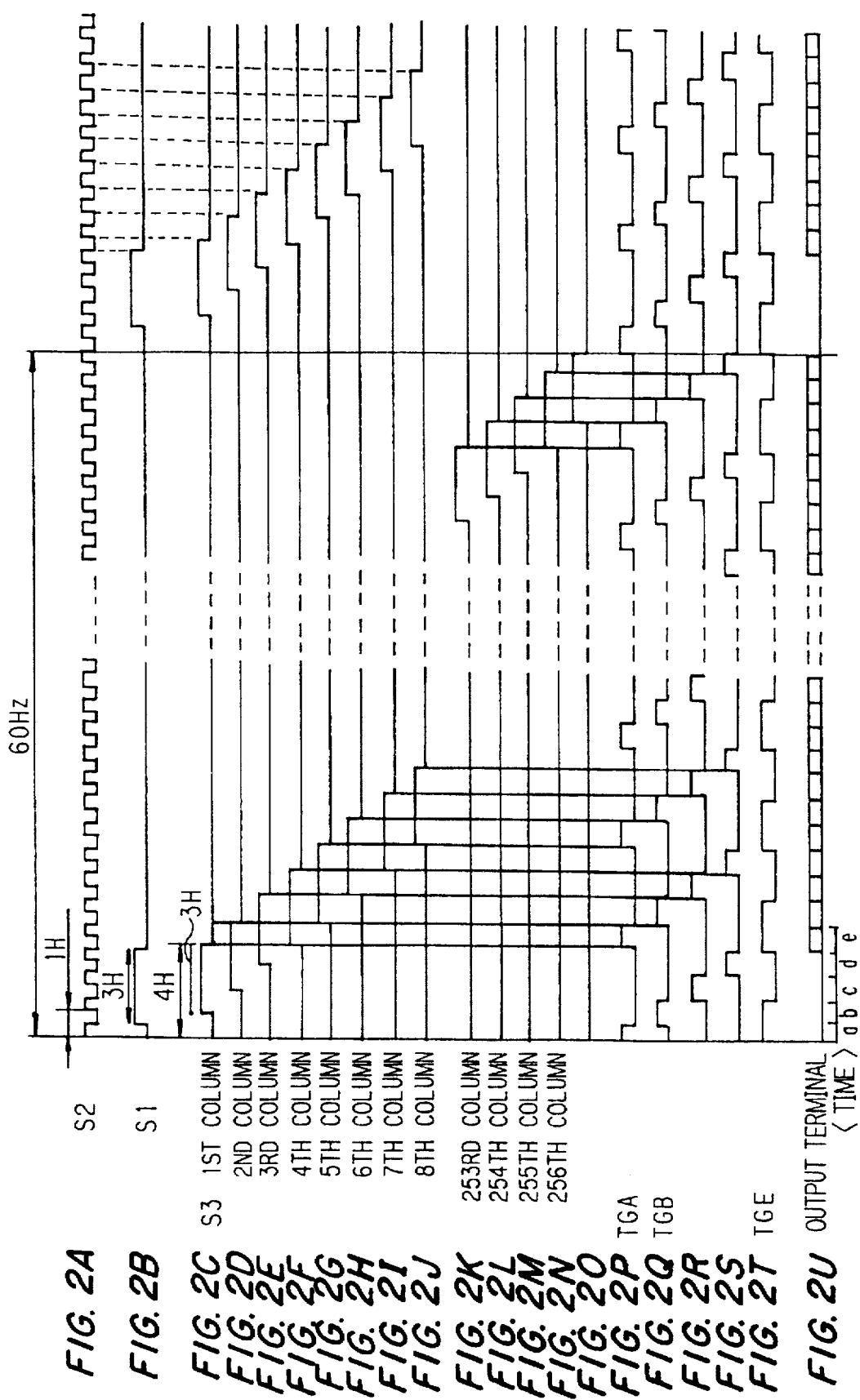
FIGS. 2A–2U shows a timing chart of various input signals of the embodiment of FIG. 1.
Figure 3:
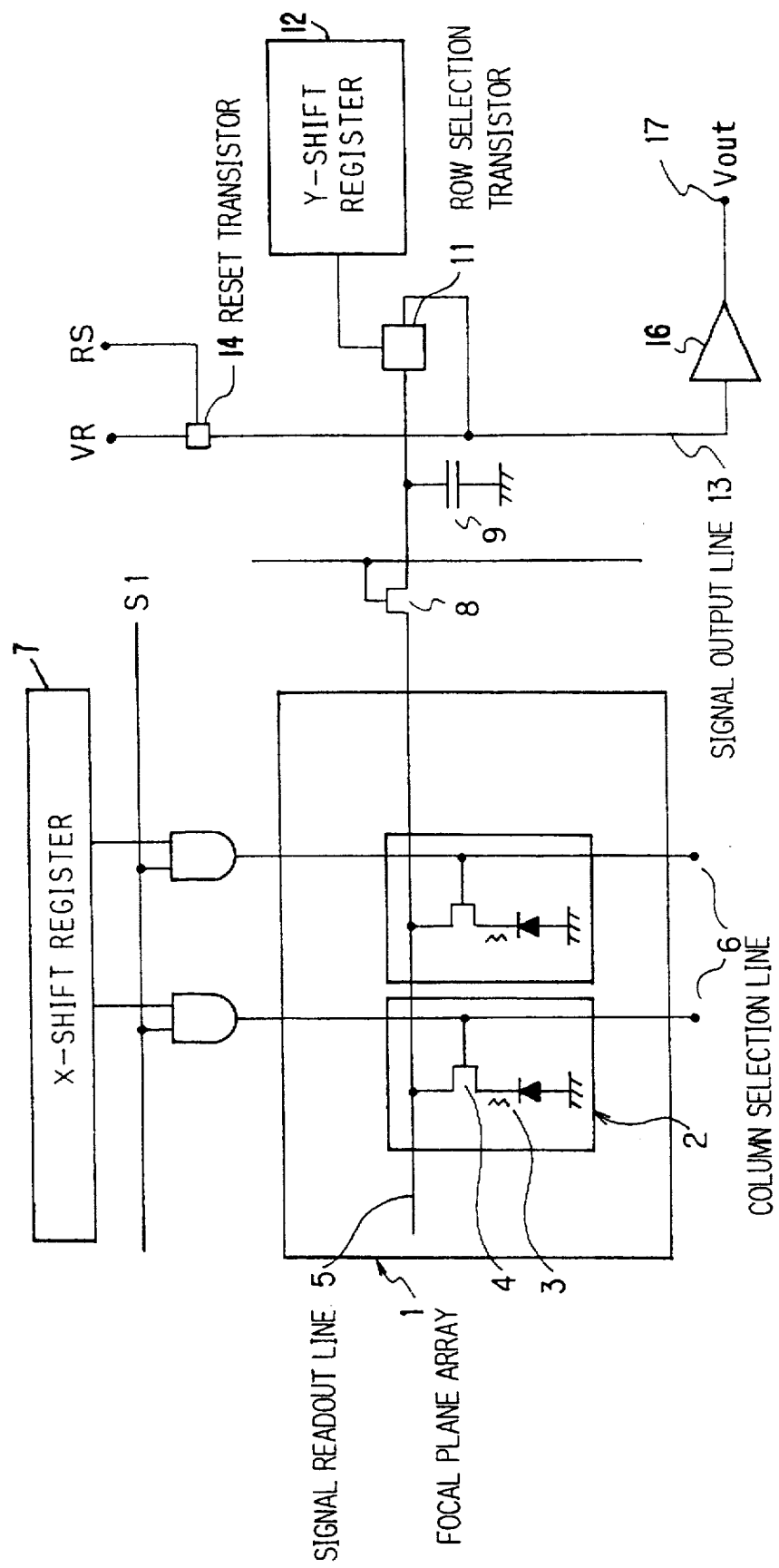
FIG. 3 shows a conventional type of line integration type signal readout circuit.
Figure 4:
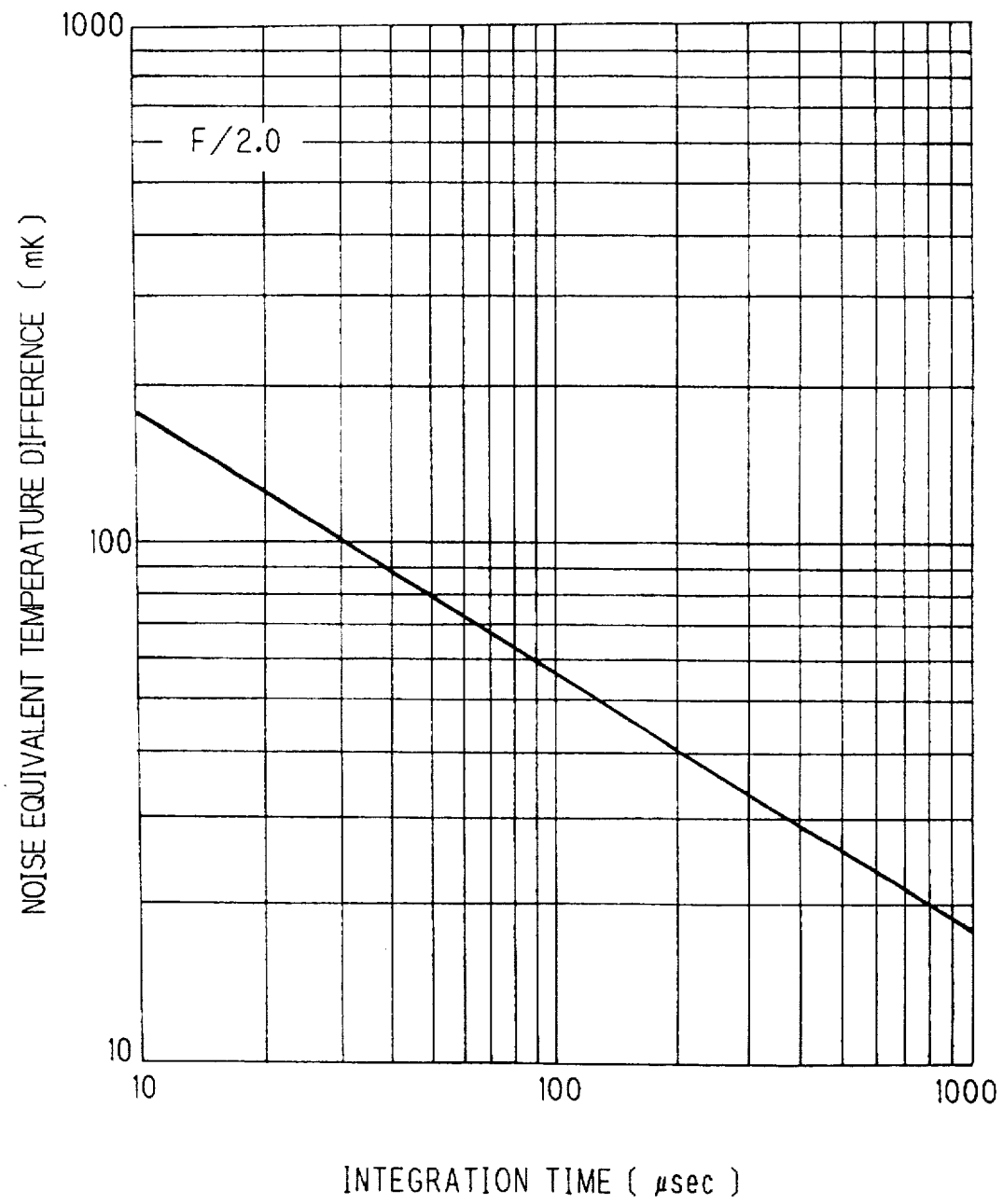
FIG. 4 shows an example of a relation between a temperature resolution and an integration time obtained from a two-dimensional array infrared detector in which HgCdTe photodiodes are employed for receiving light of long wavelength band as photo detection elements.

FIGS. 2A–2U show a timing chart of various input signals. A signal S2 is a clock signal for the X-shift register 7, and 1H is given as the shifting time of the shift register. A signal S1 defines the closing time of the column selection transistor 4, which is given herein as 3 H. Pulses TGA, TGB and TGE are control pulses to be entered into the changeover switch 15 and the exchange switch 10.

The signal detection operation is now described sequentially with reference to FIGS. 1 and 2A–2U. In description, the column selection line 6A is defined as the first column, the column selection line 6B the second column, the column selection line 6C the third column, and the column selection line 6D the fourth column of the focal plane array.

During the time between b and d, the column selection transistor 4A is closed by the first-column signal of the signal S3 from the X-shift register 7. Thereupon, the photo detection element 3A, the column selection transistor 4A, the signal readout line 5A, the DIG transistor 8A and the charge integration capacitor 9A form a series circuit, and the charge of the charge integration capacitor 9A is discharged through the DIG transistor 8A and the photo detection element 3A. The above operation is an integration process.

In the next step, at the time e, the column selection transistor 4A is opened and, at the same time, the signal of the signal readout line 5A is selected as the input signal to a buffer amplifier 16 by the exchange switches 10 and 15. Thereupon, the signal of each of the unit cells is sequentially supplied by the row selection transistor 11, from the signal output line 13 through the buffer amplifier 16 to the output terminal 17. The above operation is a readout process.

Also, at the same time, the charge integration capacitor 9A corresponding to the unit cells that have been read out is charged again one after another through the reset transistor 14. This is a reset process.

For the readout and reset operations, the output signal timing from the X-shift register 7 of the adjoining column selection lines 6 has a phase difference of 1H. Therefore, the signal of the charge integration capacitor 9 of each signal readout line 5 can be read out from one signal readout line 5 for each 1H, selectively.

According to the preferred embodiment as described above, the integration for three columns can be simultaneously performed while the readout and reset operations of any one column are performed within the period 1H of the reset operation. That is to say, $$\begin{aligned} \text{integration time} &= 3H \\ &= 1/60/256 \times 3 \\ &= 195 \, \mu s \end{aligned}$$

which permits integration six times as much as the conventional integration. This realizes a temperature resolution of around 40 mK, which corresponds to at least 2.4 times that of the conventional types.

In addition, the unit cell readout and reset times twice the conventional time can be obtained:

$$\begin{aligned} 1V &= 1/60/256/256 \\ &\approx 250 \, ns \end{aligned}$$

Furthermore, by installing and properly controlling the exchange switches 10 and 15 for the purpose of consolidating four signal readout lines 5 into one signal output line 13, their signals can be taken out of the system as single output. The time series of the output signal coincides with that of the TV monitor scanning and, therefore, no extra processing circuit is required for the time series rearrangement.

As described above, the signal readout circuit and its drive circuit according to the present invention can simultaneously integrate the charges of the integration capacitors in a plurality of columns and, while performing the integration, can also perform signal readout and reset of other column. As a result, a longer integration time can be obtained, improving the NETD of the sensor compared with the conventional ones.

What is claimed is:

1. A signal readout circuit, comprising:

a focal plane array having a plurality of unit cells arranged in a plurality of rows and columns, each of said unit cells having a first node, a second node connected to a reference potential, and a photo detection element and a selection transistor connected in series between said first and second nodes, wherein the unit cells in each row are divided into a plurality of unit cell groups;

a plurality of sets of signal readout lines, each set being associated with a different unit cell group and being connected with the first node of the unit cells which belong to the associated unit cell group;

a shift register having a plurality of selection outputs, each selection output being associated with a different unit cell group and being connected to the selection transistor of the unit cells which belong to the associated unit cell group; and a signal output line coupled to said sets of signal readout lines for transmitting a signal present in one of the signal readout lines as an output signal.

2. A signal readout circuit as recited in claim 1, wherein the shift register activates a selection output associated with one of the unit cell groups and electrically connects a unit cell in the selected unit cell group with the signal output line.

3. A signal readout circuit as recited in claim 2, wherein each unit cell group corresponds to a column of said unit cells.

4. A signal readout circuit as recited in claim 3, further comprising another shift register for selectively controlling which unit cell in the selected unit cell group is electrically connected with the signal output line.

5. A signal readout circuit as recited in claim 4, wherein each unit cell is coupled with a different signal readout line.

6. A signal readout circuit as recited in claim 5, further comprising a plurality of capacitors, each of which is coupled to a unit cell through the signal readout line associated with the unit cell and discharges in response to a detection by the photo detection element of the unit cell, wherein a voltage level remaining in the capacitor represents the signal present in the signal readout line.

7. A layout for a signal readout circuit, comprising:

a focal plane array having a plurality of unit cells arranged in a plurality of rows and columns, each of said unit cells having a first node, a second node connected to a reference potential, and a photo detection element and a selection transistor connected in series between said first and second nodes, wherein the unit cells in each row are divided into a plurality of unit cell groups;

a plurality of sets of signal readout lines, each set being associated with a different unit cell group, and being connected with the first node of the unit cells which belong to the associated unit cell group; and a shift register having a plurality of selection outputs, each selection output being associated with a different unit cell group and being connected to a selection transistor of the unit cells which belong to the associated unit cell group.

8. A signal readout circuit as recited in claim 7, wherein each unit cell group corresponds to a column of said unit cells.

9. A signal readout circuit as recited in claim 8, wherein each unit cell is coupled with a different signal readout line.

10. A signal readout circuit as recited in claim 9, further comprising a plurality of capacitors each coupled to a unit cell through the signal readout line associated with the unit cell.

* * * * *